United States Patent [19]

Wright

[11] Patent Number: 4,941,258

[45] Date of Patent: Jul. 17, 1990

[54] METHOD OF ELECTRICALLY INTERCONNECTING DOOR COMPONENTS TO MAIN POWER SUPPLY IN VEHICLE

[75] Inventor: James A. Wright, Dearborn Heights, Mich.

[73] Assignee: United Technologies Automotive, Inc., Dearborn, Mich.

[21] Appl. No.: 376,099

[22] Filed: Jul. 6, 1989

Related U.S. Application Data

[62] Division of Ser. No. 191,089, May 6, 1988, Pat. No. 4,862,011.

[51] Int. Cl.$^5$ ............................................. H01R 43/00
[52] U.S. Cl. ........................................ 29/858; 29/755; 307/10.1
[58] Field of Search ................... 29/755, 858; 307/10.1

[56] References Cited

U.S. PATENT DOCUMENTS

| 3,836,415 | 9/1979 | Hilderbrandt | 29/755 X |
| 4,652,772 | 3/1987 | Shepard | 174/117 F |
| 4,700,961 | 10/1987 | Thomas et al. | 307/10 R |

FOREIGN PATENT DOCUMENTS 57-0000912  1/1982  Japan .................................. 296/146

OTHER PUBLICATIONS

IRC Publication, p. 66, 10-14-60, "Flat Flexible Cable".

Primary Examiner—Carl E. Hall
Assistant Examiner—Carl J. Arbes

[57] ABSTRACT

An electrical, multi-wire interconnection between the hinged, movable door (3) of a vehicle and its main body (7) across the hinge gap in the form of a planar cable array (10) having a flat, laterally extended cross-section (FIG. 3), provided with a modular trim panel (3A). It includes at its distal, "A" pillar end an end connector (5A), which mates with an electrical connector (5B) in the "A" pillar. The cable fits in an embossed channel, to which it is like configured, in the door frame. When the door is closed, it is sealingly sandwiched between the metal door frame member (3B) and the rubber door seal on the vehicle body. The door may include a remote multiplexing (remux) unit (30), allowing the use of, for example, as few as about eight wires (11), even though the door is fully powered. The planar cable array can be pre-manufactured as, for example, flat ribbon cable, or made on site using a hardenable plastic (FIG. 5A) or tape-type (FIG. 5B) material during a pre-assembly, modular door panel operation off from the regular main assembly line of the final, automotive manufacturing operation. In its extent between the door and the vehicle body, the plane of the cable is vertically aligned and folds back unto itself when the door is closed (FIG. 2A) and has no significant, excess slack when the door is fully open (FIG. 2B). The wires can be included in the same plane or in up to about three, parallel layers.

8 Claims, 5 Drawing Sheets

METHOD OF ELECTRICALLY INTERCONNECTING DOOR COMPONENTS TO MAIN POWER SUPPLY IN VEHICLE

This is a division of copending application Ser. No. 07/191,089 filed on May 6, 1988 now Pat. No. 4,862,011 issued 8/29/89.

DESCRIPTION

1. Technical Field

The present invention relates to the electrical interconnection between an automotive or vehicular door, having a number of electrical components in it, and the main body of the vehicle, to which the door is, for example, hingedly attached. More particularly the present invention relates to providing the electrical, multi-wiring interfacing interconnection between the door and the main body of the vehicle across the hinge gap in the form of a relatively flat, planar cable, as opposed to the rounded, relatively thick wire bundle of the prior art.

2. Background Art

In automotive construction, typically one or more electrical components are included within the automotive door, particularly the driver's door, which are powered and/or controlled by the main electrical system of the vehicle. Examples of such automotive components include power door locks, power windows, power mirrors, electrical lights, audio speakers, and/or various control switches for seat adjustments and the like, etc.

To power these exemplary components, typically a round, electrical cable bundle is extended to the front doors from the "A" pillars of the main vehicle to connect these door components into the main electrical system of the vehicle.

Typically, the interconnecting cable, which extends from the body of the car through the "A" pillar into the door, includes a series of wires, for example, twenty-five, bundled together into a rounded, cylindrically shaped, extended bundle. Because of the nature of this construction, the cable bundle at least generally has to have a vertically or laterally extended run in its extension from the door frame to the "A" pillar, which usually has somewhat of an "S" configuration. This vertically or laterally extended run prevents wires on the outside areas of the cylindrical cable bundle from becoming over-stressed, as the door is continuously opened and closed during the life-time use of the vehicle, which could cause the outer electrical wires in the bundle to break.

Such an exemplary prior art cable bundle construction, with a vertical run, is shown in FIG. 1.

In contrast, the present invention uses a relatively flat, planar cable array at the door junction. Such a planar cable array avoids the need for any vertically or laterally extended run of the cable and inherently avoids any over-stressing of the cable as the door is opened and closed during its normal operation. The present invention thus provides a more compact, shorter run, saving on wiring expense and taking up less space, while providing an electrical interconnection which is highly reliable, flexible and long-lasting. It additionally eliminates the relatively costly, protective rubber boot typically used across the hinge gap to cover the cylindrical cable bundle of the prior art.

DISCLOSURE OF INVENTION

Thus, the present invention utilizes a relatively flat, planar cable array at the door junction in place of the typical, cylindrical, relatively thick cable bundle, having a relatively large number of wires across its diameter or center cross-section, used in the prior art. Such a relatively flat array includes multiple, at least generally parallel, wires, in which all of the wires lie in the same plane, similar to flat ribbon cable, or in multiple layers, including up to about three parallel planes. The main criteria is that the cable array not have more than about three wires across its thickness and is typically relatively thin, being usually substantially wider than it is thick, with its thickness being comparable to one or at most about three wires thick, typically with a ratio of thickness to width of about no more than 1:4, or, stated in others terms, the cable array typically will be at least about four times wider than it is thick.

When provided as part of a modular door panel, the at least relatively flat planar cable is sandwiched between the modular door panel and the door frame member, with typically the opposed portion of the flexible door seal on the vehicle body and the cable and the door frame side edge area in combination forming a face-to-face seal. This eliminates the need for the relatively costly step of punching a hole in the side edge of the metal door frame. Additionally, the planar cable preferably is terminated in an end connector, which mates with a like connector positioned in an opening in the "A" pillar of the vehicle, which also provides economies in cost and assembly time.

The planar cable array interconnection between the door and the main body of the car can be made up in a prior, wire manufacturing operation or assembled and manufactured on-site as part of the door assembly or sub-assembly operation. In such on-site manufacturing the multiple wires are arrayed and held in parallel juxtaposition and their relative positions fixed in place by, for example, a premolded, flexible plastic part or by the application of an appropriate holding or bonding medium in the form of, for example, adhesive tape or in the form of an initially fluid plastic medium, which ultimately hardens around the wires, holding them in place.

With respect to a sub-assembly application, the planar cable can be manufactured as part of, for example, a modular door panel manufacturing operation, in which the required number of wires are encapsulated in situ or otherwise enclosed during the sub-assembly operation. For further information on such an exemplary modular door panel sub-assembly operation, reference is had to assignee's copending U.S. patent application Ser. No. 07/097,555 of R. Basson et al, filed Sept. 15, 1987, entitled "Modular Trim Panel Unit For Motor Vehicle Doors," (issued as U.S. Pat. No. 4,882,842 on Nov. 28, 1989), the disclosure of which is incorporated herein by reference.

The present invention is may be used in conjunction with a multiplexing system, wherein part of the multiplexing is achieved by a "remux" or remote multiplexing control panel module located within the door itself. This allows for, for example, as few as eight wires, even for a fully powered door which includes an electrically powered window and controls for the other powered windows, a powered door lock, audio speaker, seat positioning controls, and even a powered, heated side rear-view mirror. Such a system, having a relatively few wires despite its large number of electrical components, particularly lends itself to the present invention and the invention's planar cable approach to interconnecting the automotive powered door to the main electrical power system located within the body of the vehicle.

For further information on such an automotive door multiplexing system reference is had to assignee's co-pending U.S. patent application of D. Tinder, filed on even date with the parent application hereof, entitled "Automotive Door Multiplexing System" (Ser. No. 07/191,097; issued as U.S. Pat. No. 4,883,974 on Nov. 28, 1989), the disclosure of which is also incorporated herein by reference.

The foregoing and other features and advantages of the present invention will become more apparent from the following further description and drawings.

BRIEF DESCRIPTION OF DRAWINGS

FIG. 2A is a top, partial, detail, cross-sectional view showing the planar cable interconnection of FIG. 2 across the hinge gap folded back at least partially unto itself when the door is in its closed position; while

FIG. 5A is an end, cross-sectional view a modular door panel made in a sub-assembly operation for ultimate assembly with a door frame on the main assembly line, with the modular door panel using the planar cable interconnection of the present invention, with the wires of the planar cable being positioned on the back-side of the modular door panel and with the wires being made into the planar cable by being cast in situ with the use of a fluid material which hardens in place as part of the modular panel sub-assembly operation; while

BEST MODE FOR CARRYING OUT THE INVENTION

Figure 1:
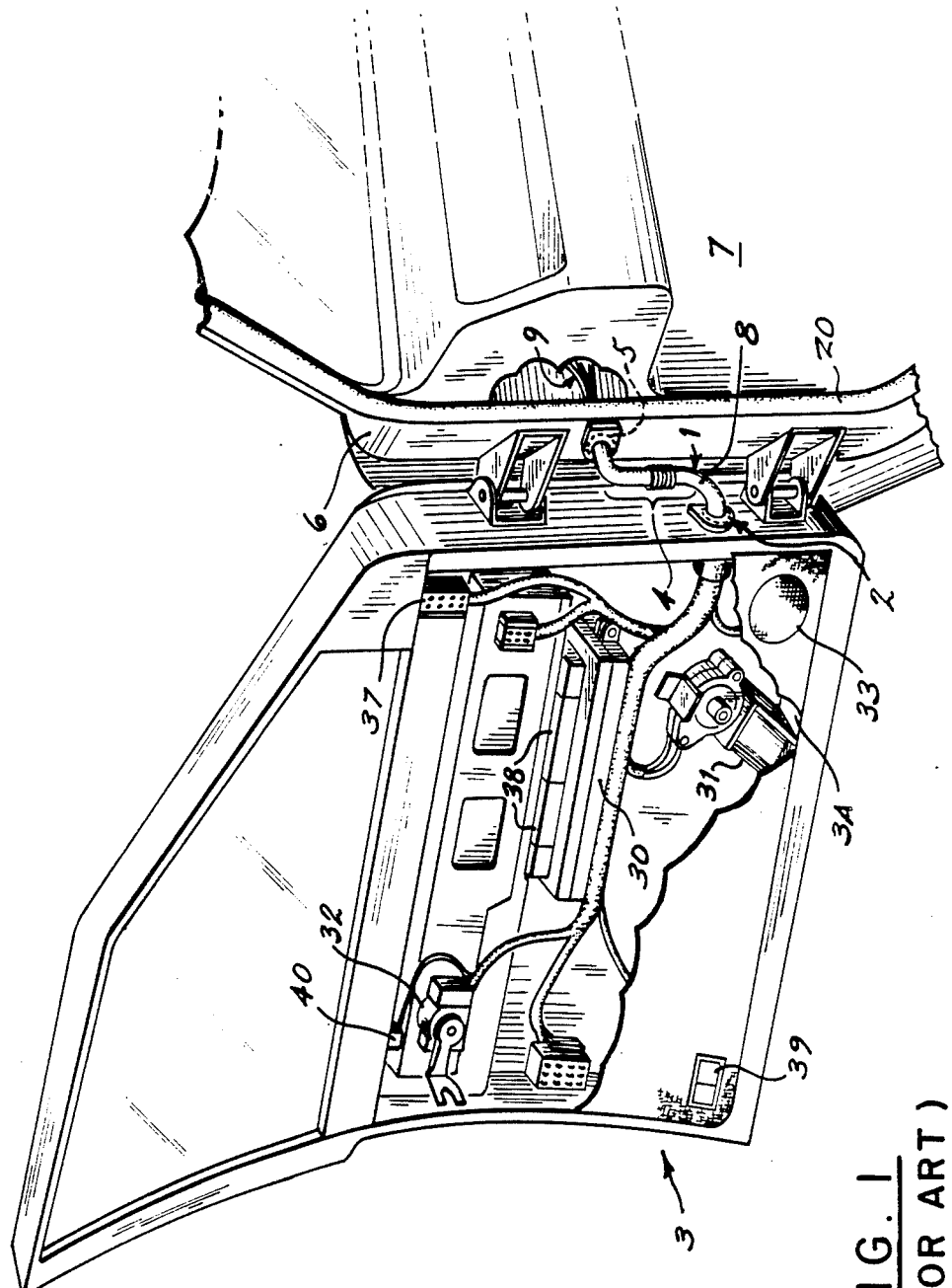
FIG. 1 is a perspective view taken from the interior side of the driver's door (with the finish trim layer partially cut away to show the internal electrical components) in its open position, showing the prior art's cylindrically extended, relatively thick, cable bundle extending in a "S" configuration from the door into the "A" pillar, using in part a vertical run, for the electrical interconnection of the electrically powered door components into the main electrical system of the vehicle.

As can be seen in FIG. 1, the typical prior art approach to interconnecting the various electrical components in a door to the main electrical system of the vehicle included a bundle of, for example, twenty-four wires bundled together in a rounded, cylindrically extended, relatively thick cable bundle 1. Such an exemplary wire bundle 1 might have a diameter of, for example, approximately three-quarters of an inch.

The bundle 1 typically extends between a door opening or cut out area 2 in the near side edge of the door 3, in somewhat of a "S" configuration with a vertical (or lateral) run 4 across the hinge gap, and a body opening or cut out area 5 in the "A" pillar 6 of the vehicle body 7. The cable bundle 1 actually begins in the vehicle body 7 in the form of a number of individual wires 9 (for example twenty-four), which in the assembly line operation are extended in a bundle, typically through the rubber protective boot 8, into the door 3. The main electrical system is typically powered by a twelve or twenty-four volt DC battery or the vehicle's alternator system.

The vertical (or lateral) run 4, which causes the cable bundle 1 to essentially take somewhat of an "S" configuration, is necessary to prevent the outer wires of the cable bundle from becoming over-stressed as the door is continuously opened and closed in its normal operation and use over the life-time of the vehicle. Without such a vertically extended "S" configured run, or a laterally extended run, or other equivalent extension, the outer individual wires of the bundle 1 would likely become over-stressed and broken, breaking and deactivating the electrical circuit(s) associated with the broken wire(s).

Figure 2:
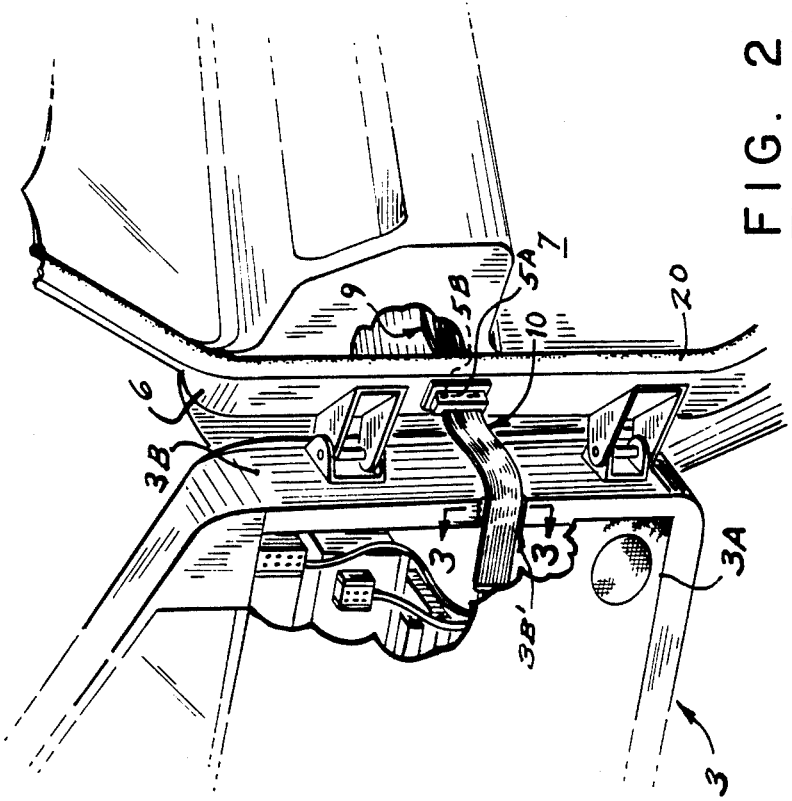
FIG. 2 is a like perspective view to that of FIG. 1, but instead being only a partial view of the door and illustrating the preferred, exemplary embodiment of the planar cable array of the present invention used for the electrical interconnection of the door to the vehicle's main electrical system, with the plane of the cable being at least generally vertically aligned and positioned in an embossed area between the door frame and the interior trim panel module.

In contrast, as can be seen in FIG. 2, the electrical interconnection of the present invention, in its extension from the door 3 to the "A" pillar 6 across the hinge gap, takes the form of a flat, planar cable 10, which avoids the need for any vertical or lateral run having an "S" configuration or the like for the electrical interconnecting cable.

Figure 3:
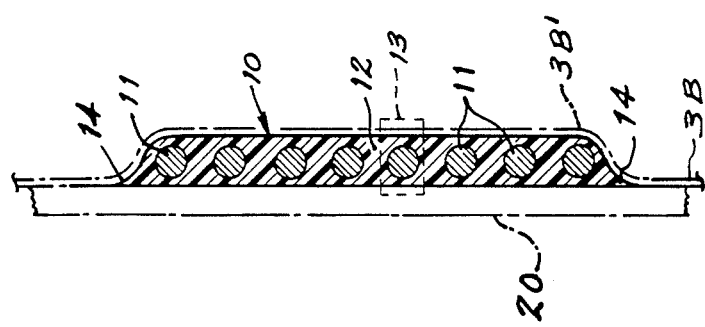
FIG. 3 is a cross-sectional, end view of an exemplary planar cable array showing eight exemplary electrical wires all lying in the same lateral plane, taken along section lines 3—3 of FIG. 2, also showing, when the door is closed, the sealing, sandwich engagement between the cable and the embossed channel and its surrounding edge areas of the door frame member and the flexible seal member on the vehicle body (the latter members being shown in phantom line).

As can be seen in FIG. 3, the planar cable 10 of the invention is flat and laterally extended, being substantially wider than it is thick, ideally having each of the individual wires 11 located in the same lateral plane held in their relative positions by being placed in a plastic, insulating band or webbing of material 12. Each orthogonal section 13 of the cable 10, as it is laterally traversed from side to side, includes only one wire.

Alternatively, if there are a relatively large number of wires, including for example, forty-five wires, multiple layers of wires could be used, for example, three parallel layers of fifteen wires each. However, no more than about three layers should be used in order to avoid the potential of over-stressing of the outer wires of the prior art, as the cable is flexed back and forth during the opening and closing of the door. As a general rule the planar cable array should not be less than about four times as wide as it is thick.

Thus, in order to allow the cable array to be continuously bent back and forth directly back upon itself without damaging any of the wires 11 over a period of time, the cable array 10 must be kept relatively thin and flat, preferably with a maximum of three wires occupying each orthogonal section 13 across the width of the cable array (note FIG. 3). As can best be seen in FIG. 3, the edges 14 of the planar cable 10 are flared and configured to mate with the opposed, curved, embossed area or channel 3B' in the metal door frame section 3B in order to form a face-to-face sealing engagement with it. In combination together and when the door 3 is closed (note FIGS. 2A & 3), they form—with the flexible, typically rubber, door seal 20 located on the body of the vehicle—flat, vertical, interfacing surfaces to provide a good seal. By this face-to-face, combined, sealing engagement between the planar cable, the door frame member 3B and the rubber door seal 20, no metal cut out or opening in the door frame member, which typically required a separate sealing member, is necessary, as in the prior art of FIG. 1, but instead only the relatively inexpensive stamped, embossment channel 3B', shown in FIGS. 2 & 3, is needed. Other designs are of course possible, but the important thing is that the three elements together form a seal between them at the side edge area of the door frame member 3B.

An exemplary, single layer cable made in accordance with the present invention could have, for example, a thickness of preferably about two-tenths of an inch and a width of the order of about one-and-a-quarter inches for an eight or nine wire array, thus having an exemplary ratio of thickness to width of about 16:100, which of course is less than the exemplary maximum ratio of about 1:4.

The planar cable array 10 can be pre-manufactured as, for example, flat ribbon cable, or initially provided as separate, preferably individually insulated wires. The individual wires are then in the assembly of the door, or in the manufacture of a modular door panel in a sub-assembly operation, extended and positioned in juxtaposed, parallel array and cast in situ or otherwise held together, as explained more fully below with reference to FIGS. 5A & 5B.

Figure 2A:
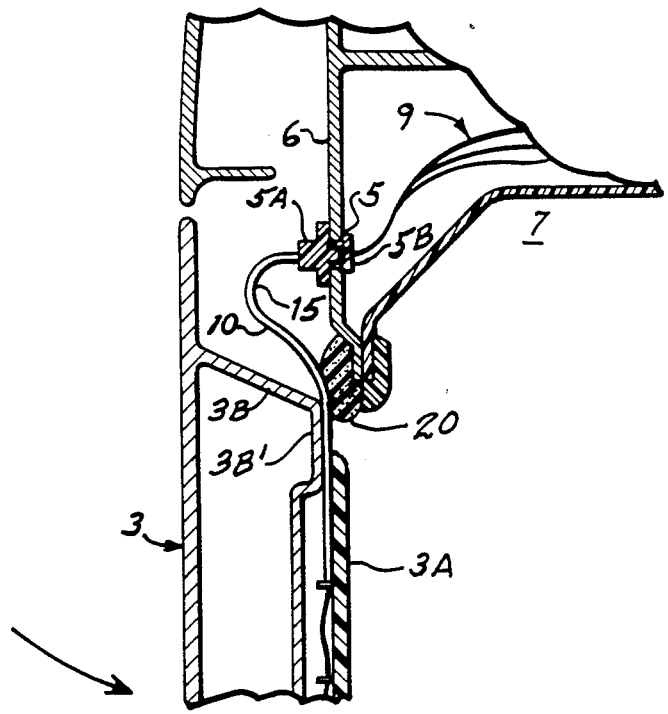
Figure 2B:
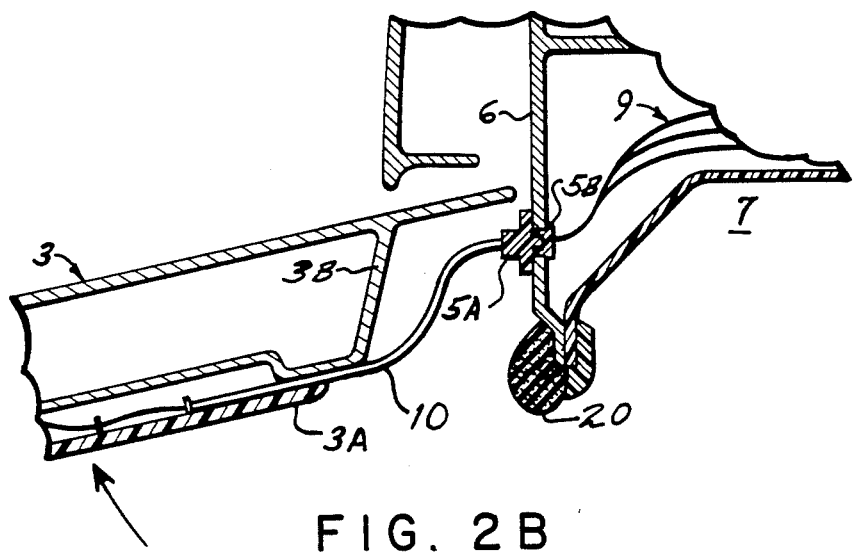
FIG. 2B is a view similar to that of FIG. 2A, but with the door in its fully open position, with the planar cable interconnection of FIG. 2 at least generally fully extended across the hinge gap with no significant slack.

When the planar cable array 10 is used across the hinge gap as the electrical interconnection between the door 3 and the main electrical system in the vehicle body 7, as can best be seen in FIGS. 2A & 2B, the main or lateral plane of the cable lays in a vertical alignment parallel to the hinge axis. As the door is moved from an open position (FIG. 2B) to its closed position (FIG. 2A) and vice-versa, the planar cable 10 folds back off and then onto itself about a vertical fold line 15 parallel to the hinge axis. Of course, if the hinge axis for the door 3 is canted or angled somewhat from the vertical, the plane of the cable 10 will only be generally vertical in its alignment.

Additionally, preferably, the door opening 2 and the body opening 5 for the interconnecting cable 10 are at the same vertical level, with there just being a little over enough extent or length of the planar cable 10 between the openings 2, 5 to make it across the hinge gap when the door 3 is fully open (FIG. 2B), thereby eliminating any wasted wire length. As can be seen in FIG. 2B, there is preferably no significant play or excess cable length between the openings 2, 5 when the door 3 is fully open to its maximum open position.

Figure 4:
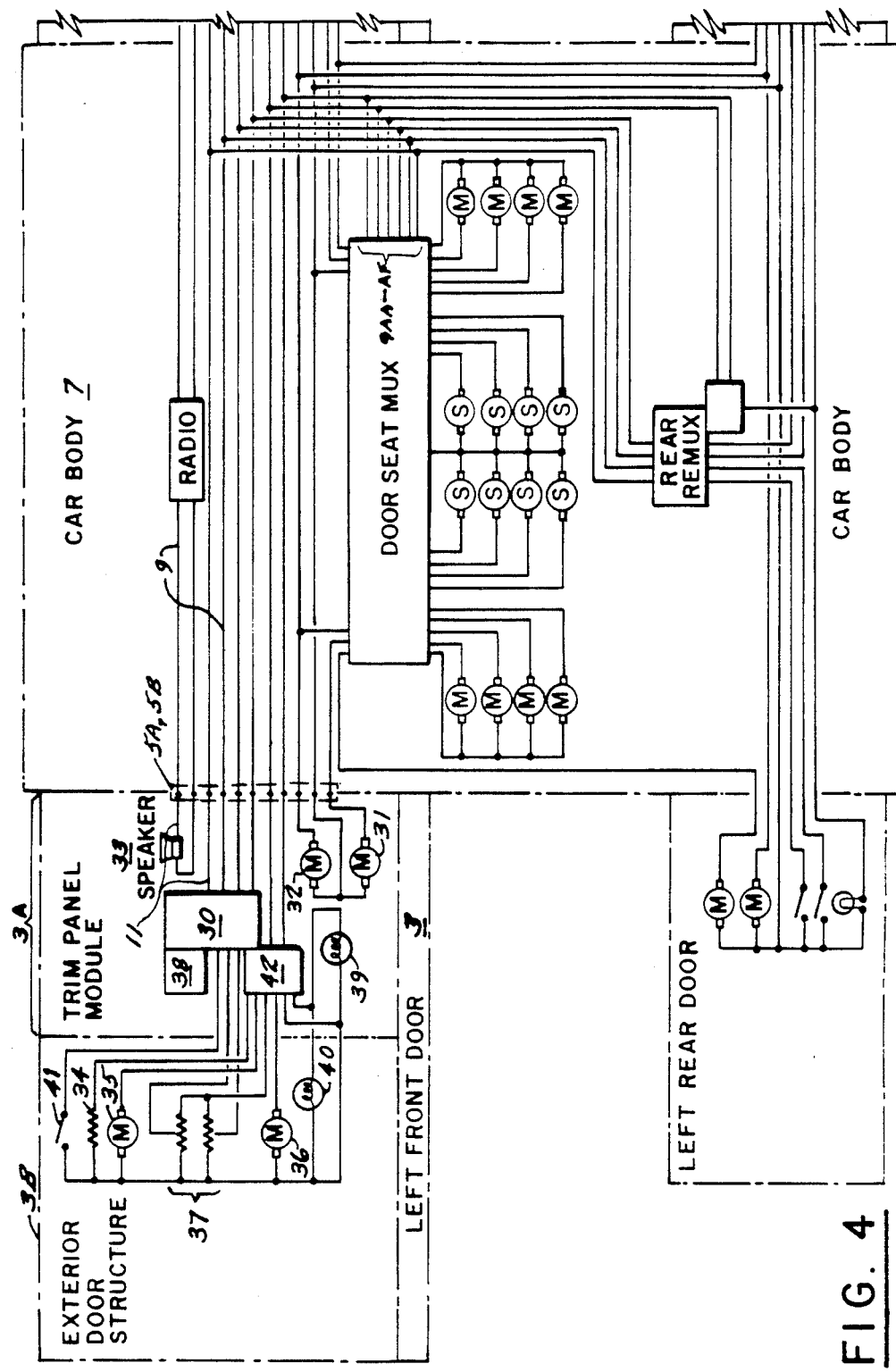
FIG. 4 is an electrical schematic of an exemplary wiring circuit for the electrical door components utilizing a remote multiplexing control module or "remux" within the door itself, with such a system allowing the use of a relatively few wires even for a highly powered door, such as the exemplary one illustrated.

As illustrated in the schematic of FIG. 4, if a part of the multiplexing system of the vehicle's electrical system is included within the driver's door 3 in the form of a remote multiplexing module or "remux" 30, a total of, for example, only about twelve or even eight wires are necessary to be extended from the door to the main electrical system through the individual wires 9 in the vehicle body 7, even for a highly powered, driver's door 3. The door electrical components can include, for example, electrically powered windows having drive motors 31 and switch array controls 38, not only for the adjacent window, but also for the other windows and well as other door components; a powered door lock actuator 32; audio speaker 33; seat positioning controls; a curb lamp 39; a key lock light 40 actuated by the exterior handle switch 41; and even a powered, heated, side rear-view mirror having a heater 34, a vertical movement motor 35 and a horizontal movement motor 36 working under the controls 37. In the exemplary schematic shown in FIG. 4, the exemplary circuit uses nine electrical wires, along with two audio speaker wires, extending from the door 3 to the main vehicle body 7 across the hinge gap in the form of a planar cable array 10.

This reduced number of wires particularly lends itself to the planar cable array interconnection approach of the present invention. Thus, even though the door 3 includes such electrically powered components, as the electrically powered door lock 32, the electrically operated and powered window system 31, an electrically powered and heated, side, rear-view mirror, and the audio speaker 33, such fully powered door only requires, with the remote multiplexing module 30 in the door, an exemplary nine wires. For further background on the multiplexing aspects of this specification, and in particular how the number of wires 11 can be varied, depending on, for example, circuitry changes and programming logic, reference is had to the co-pending application entitled "Automotive Door Multiplexing System" referred to above, the disclosure of which is incorporated herein by reference.

Although the planar cable can be added to the door 3 during the main manufacturing assembly of the vehicle, it alternatively can be provided as part of a modular door panel sub-assembly operation, such as that generally described in the co-pending U.S. application Ser. No. 07/097,555 referred to above. As can be seen in or generally understood from FIGS. 1, 2 & 4, such an interior door trim panel module 3A can, for example, have mounted on it the remux unit 30; the panel actuator or switch panel portion 38 for the powered door lock 32, etc.; the actuator and power drive portions 31 of the powered window system; the audio speaker 33; etc. All of the direct or indirect power wires 11 for these items can be initially collected together in a bundle within the panel module 3A, as illustrated in FIG. 2, and then positioned in parallel array flat against the internal side of the interior trim panel module 3A at an area across from the embossed channel in the door frame member 3B. Alternatively, flat cabling or wiring could be used all across the lateral extent of the panel module 3A too, if so desired.

The planar cable 10 then extends out from the combined edges of the panel 3A and door frame member 3B, being sandwiched between them in the embossed channel 3B' formed in the door frame member, from the door to an extent sufficient to go across the hinge gap, when the door 3 is fully open, and additionally extend to the "A" pillar body opening 5 with its fixed, mating electrical connector 5B. In turn the "A" pillar connector 5B on its interior side is connected by soldering or the like to the ends of the individual wires 9, which are interconnected to the main electrical power system of the vehicle.

Figure 5A:
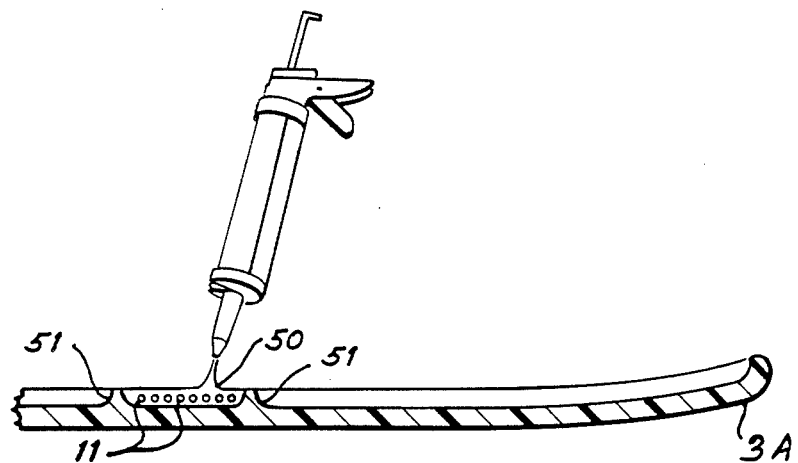

The planar cable 10 could be pre-manufactured as, for example, ribbon cable with the end connector 5A, or, particularly in view of the fact that a different number of wires 11 are used for differently equipped door panels 3A or with differently configured circuits, it could be produced on site as part of the sub-assembly modular operation. In the latter instance and as can be seen in FIG. 5A, the wires 11 are fixed or held in place in side-by-side, parallel array, and a liquid, bonding, preferably insulating material 50 added about them. The plastic material 50 is then allowed to harden in place, using mold walls or channel 51, producing, when appropriately flared and extended in the area which will be across from the channel area 3B' in the side edge of the door frame member 3B, an analogous cast-in-situ version of the planar cable structure shown in FIG. 3. An exemplary material 50 would be a suitable thermosetting polyurethane elastomer. The channel walls 51 could be molded in as part of the molded panel module 3A.

Alternatively, rather than being in liquid or flowable form, at least one layer or, alternatively, two layers of thermoplastic bonding material could be positioned above and below the positioned wires 11, in sandwich fashion, and the layers heated to melting and thereafter allowed to solidify, producing the planar cable.

Figure 5B:
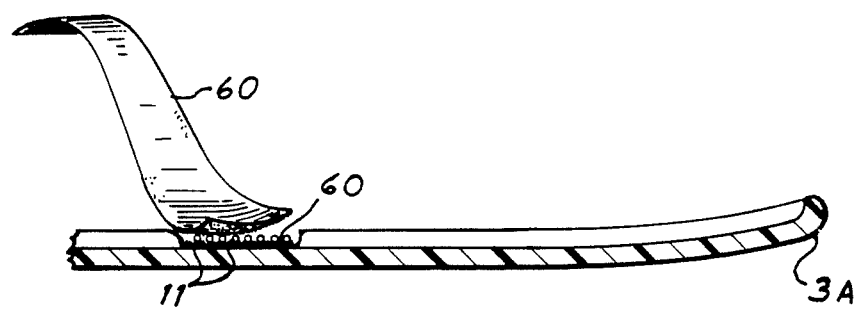
FIG. 5B is a view similar to FIG. 5A, but with the wires being made on site in the sub-assembly operation into the planar cable with the use of adhesive tape members as part of the modular panel sub-assembly operation.

A further exemplary, alternate method of making the planar cable on site is illustrated in FIG. 5B. As can be seen, pieces of tape-type adhesive material 60 are placed above and below the positioned wires 11, in sandwich fashion, and the "sandwich" layers pressed together until the cable elements are fully bonded together, forming the planar cable structure.

It should be understood that FIGS. 5A & 5B are merely generalized, symbolic illustrations of the methodology and are not necessarily to be taken literally.

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below:

1. A method of electrically interconnecting several electrical components in a movable, hinged door having a hinge axis on a vehicle body to a main electrical power supply system in the body, in which a door side edge area and a body opening are provided for interconnecting electrical wiring between the door and the body, comprising the following steps:
   (a) utilizing a relatively flat and substantially laterally extended, electrical, planar cable, which has included within it a series of juxtaposed, substantially parallel, extended electrical wires in a substantially side-by-side array defining a laterally extended plane, there being of the order of at least about four wires in at least general side-by-side array with less than about four wires in its thickness dimension, in said electrical cable;
   (b) extending said relatively flat, planar cable from said door through said door side edge area at least adjacent to said body opening, and using it to at least indirectly electrically interconnect the electrical components in said door into the main power supply system in the vehicle body; and
   (c) aligning, extending and positioning said planar cable in its extent from said door adjacent to said body opening with the laterally extended plane of said planar cable at least generally lying in a substantially vertical plane, with the planar cable being folded back onto itself with a fold-line substantially parallel to the hinge axis of the door when the door is closed, with the plane of said planar cable array being substantially vertically aligned as it travels from the door side edge area over adjacent to the body opening, with a length of said planar cable between said door side edge area and said body opening being substantially equal to a separation distance between said door side edge area and said body opening when the door is in its maximum, open position, without any additional significant slack in the electrical cable between the door and the body opening when the door is completely open, with said planar cable extending directly across from said door side edge area to said body opening in at least a generally horizontal path.

2. The method of claim 1, wherein there is included the further step(s) of:
   preassembling the wires needed for the electrical components on a modular door panel in a sub-assembly operation and joining the wires together to form the planar cable at least for the extent of the wires to be extended from the door side edge area to at least near their terminal end portions for connection to the power supply system in the vehicle body.

3. The method of claim 2, wherein there is included the further step(s) of:
   applying a liquid material to said wires, embedding them in it, and allowing the material to harden, forming said planar cable.

4. The method of claim 2, wherein there is included the further step(s) of:
   applying a tape-type material to said wires, holding them together with the material, to form said planar cable.

5. The method of claim 1, wherein there is included the further step(s) of:
   placing a laterally extended electrical connector in said body opening and attaching electrical wires from its underside to the main electrical power supply system in the vehicle body; and
   attaching a mating, end connector on an end of said planar cable distal to said laterally extended electrical connector in said body opening, electrically interconnecting said planar cable to the main electrical power supply system in the vehicle body.

6. A method of electrically interconnecting several electrical components in a movable, hinged door on a vehicle body to a main electrical power supply system in the body, in which a door side edge area and a body opening are provided for electrically interconnecting wiring between the door and the body, comprising the following steps:
   (a) utilizing a relatively flat and laterally extended, electrical, planar cable structure for the electrical interconnection between the door and the vehicle body, which planar cable structure has included within it a series of juxtaposed, substantially parallel, extended electrical wires in a substantially side-by-side array, there being of the order of about at least four wires in a substantially side-by-side array with less than about four wires in its thickness dimension, in said electrical cable;

(b) making a modular door panel in a sub-assembly operation, including mounting a number of electrical components and wiring therefore on the modular door panel, and extending the wires to be used for said relatively flat, planar cable structure for a sufficient length to extend from said door through said door side edge area to said body opening for ultimate use in at least indirectly electrically interconnecting the electrical components in said door into the main electrical power supply system in the vehicle body; and (c) positioning the wires for the electrical components on the modular door panel in said sub-assembly operation and joining the wires together to form the planar cable at least for the extend of the wires to be extended from the door side edge area to their distal, terminal end portions for connection to the power supply system in the vehicle body.

7. The method of claim 6, wherein there is included the further step(s) of:
applying a liquid material to said wires, embedding them in it, and allowing the material to harden, forming said planar cable.

8. The method of claim 6, wherein there is included the further step(s) of:
applying a tape-type material to said wires, holding them together with the material, to form said planar cable.

* * * * *